US012588779B2

(12) United States Patent
Chen et al.

(10) Patent No.: US 12,588,779 B2
(45) Date of Patent: Mar. 31, 2026

(54) DRIP COFFEE FILTER STRUCTURE

(71) Applicants: Ming-Yang Chen, New Taipei City (TW); Chan-Liang Wang, New Taipei City (TW); Ming-Sheng Chen, New Taipei City (TW)

(72) Inventors: Ming-Yang Chen, New Taipei City (TW); Chan-Liang Wang, New Taipei City (TW); Ming-Sheng Chen, New Taipei City (TW)

( * ) Notice: Subject to any disclaimer, the term of this patent is extended or adjusted under 35 U.S.C. 154(b) by 402 days.

(21) Appl. No.: 18/028,518

(22) PCT Filed: Feb. 25, 2021

(86) PCT No.: PCT/CN2021/077880
§ 371 (c)(1),
(2) Date: Mar. 24, 2023

(87) PCT Pub. No.: WO2022/178756
PCT Pub. Date: Sep. 1, 2022

(65) Prior Publication Data
US 2023/0355028 A1     Nov. 9, 2023

(51) Int. Cl.
*A47J 31/06* (2006.01)

(52) U.S. Cl.
CPC ................................. *A47J 31/0626* (2013.01)

(58) Field of Classification Search
CPC ........ A47J 31/02; A47J 31/06; A47J 31/0626; A47J 31/08
See application file for complete search history.

(56) References Cited

FOREIGN PATENT DOCUMENTS

| CN | 204957239 U | * | 1/2016 |
| JP | 2012179265 A | | 9/2012 |
| TW | M537455 U | | 3/2017 |

* cited by examiner

*Primary Examiner* — Dirk R Bass
(74) *Attorney, Agent, or Firm* — LANWAY IPR SERVICES; Chun-Ming Shih

(57) ABSTRACT

A drip coffee filter structure in the present disclosure comprises a filter bag and two hanging ear devices designed at two lateral sides of the filter bag, respectively. The hanging ear devices make the filter bag hang on a cup upright or lopsidedly for extraction of coffee as required.

7 Claims, 7 Drawing Sheets

DRIP COFFEE FILTER STRUCTURE

BACKGROUND OF THE INVENTION

1. Field of the Invention

The present invention relates to a drip coffee filter structure which is hung on a container for extraction of coffee, particularly a drip coffee filter structure hung and fixed on a container upright or lopsidedly for extraction of coffee as required.

2. Description of Related Art

Drip coffee/hanging ear drip coffee is characteristic of ground coffee powders inside a paper filter hung on a cup rim for brewing in hot water, extraction of enticing flavor and coffee tasting of a coffee drinker.

According to existing methods for extraction of drip coffee/hanging ear drip coffee, flavor of coffee extracted within a period of brewing time and with a distinct method, for example, a paper filter manufactured as a quasi-cube filter bag or a funneled filter bag, is disparate. The methods for brewing coffee in a quasi-cube filter bag or a funneled filter bag are explained as follows:

(1) Quasi-cube filter bag: A quasi-cube filter bag including a water inlet at top is hung on a cup rim with hanging ears such that hot water to brew coffee powders is poured into the water inlet opened at the top of the filter bag. A quasi-cube filter bag is characteristic of a long bottom with which time spent in contacts between coffee powders and hot water is controllably prolonged as required for extraction of flavor of coffee with a distinct concentration.

(2) Funneled filter bag: A funneled filter bag with a top water inlet greater than a bottom in area makes brewed liquid coffee injected into a cup directly for minimal contact time of hot water and coffee powders, fast extraction of coffee and fresh coffee taste.

However, drip coffee commercially available is brewed and extracted by an off-the-shelf filter bag, quasi-cube or funneled, without a brewing mode of a filter bag changeable.

SUMMARY OF THE INVENTION

In virtue of the above issue, the present invention provides a drip coffee filter structure for settlement of the issue on the technical background.

A drip coffee filter structure in the present disclosure comprises at least: a filter bag which has a cavity internally and comprises a water inlet opened thereon and tear-off edges at both sides adjacent to the water inlet wherein each tear-off edge is closed normally and torn open optionally; two hanging ear devices on both sides of the filter bag, respectively, wherein: each of the hanging ear devices comprises (a) a fixed portion inside the hanging ear device, (b) a connective segment extending from the top of the fixed portion, (c) two first engagement portions extending to both sides from the connective segment, respectively, (d) a first hook portion extending from each of the first engagement portions, (e) an inner annulus segment extending from the top of the connective segment and surrounding the fixed portion and the connective segment circumferentially, (f) a second engagement portion extending inward from each of the inner annulus segments and (g) a second hook portion extending from each of the second engagement portions. In the present disclosure, the first hook portions make multiple first slots develop at inner sides of the inner annulus segment; the second hook portions make multiple second slots develop at inner sides of the inner annulus segment; the inner annulus segment links an outer annulus segment circumferentially; the outer annulus segment and the fixed portion are fixed at both lateral sides of the filter bag, respectively. Accordingly, the inner annulus segment which is being pulled outward is separated from the outer annulus segment and the connective segment is affected correspondingly, that is, the fixed portion along with two lateral sides of the filter bag are hauled out by the connective segment for stretching the cavity. A drip coffee filter is hung with a crevice between the inner annulus segment and the connective segment or inner spaces of the first slot and the second slot positioned at a cup rim of a cup for extraction of coffee by a distinct hanging mode as required.

In a preferred embodiment, the hanging ear device comprises multiple cut-off lines cut on a sheet material for development of several tensile, foldable and stretchable sections subject to the cut-off lines, that is, the connective segment, the first engagement portions, the inner annulus segment and the second engagement portions, on the sheet material.

In a preferred embodiment, the two first engagement portions are adjacent to the water inlet but the two second engagement portions are away from the water inlet such that the two first engagement portions on top and the two opposite second engagement portions on bottom sit atop four corners inside the inner annulus segment In a preferred embodiment, each of the first hook portions extends toward the center of the fixed portion horizontally and has a hooked contour further extending downward and outward and becoming a continuous inverted-hook shape.

In a preferred embodiment, each of the second hook portions has a hooked contour vertically extending toward the water inlet and becoming a continuous inverted-hook shape which extends horizontally and keeps away from the water inlet.

In a preferred embodiment, the outer annulus segment forms multiple concave portions at the inner side.

In a preferred embodiment, the inner annulus segment comprises multiple convex portions extending outward for development of concave portions at the inner side of the outer annulus segment correspondingly.

In a preferred embodiment, the inner annulus segment comprises a pull-out portion extending outward from one edge and making the outer annulus segment form a detachment portion.

In a preferred embodiment, the water inlet is provided with a sealing edge to be torn open.

A drip coffee filter structure in the present disclosure proves effective in gaining advantages as follows: the filter bag can be hung on a cup rim of a container upright or lopsidedly through the multiple structural sections, which are tensile, foldable and stretchable and designed on a hanging ear device; the water inlet at the top of the filter bag hung on a cup rim of a container upright is opened for extraction of drip coffee; a funneled paper filter, which is made with at least a top lateral side adjacent to the water inlet opened in the case of brewing coffee in a funneled filter bag, is hung on a cup rim of a container lopsidedly for extraction of drip coffee. Accordingly, with hanging ear devices adjusted for hanging of a filter bag flexibly, coffee is brewed in a quasi-cube filter bag or a funneled filter bag changed from a quasi-cube filter bag by a coffee drinker optionally.

DETAILED DESCRIPTION OF THE PREFERRED EMBODIMENTS

The technical contents, features and effects of a drip coffee filter structure are clearly explained in preferred embodiments and accompanying drawings as follows.

The terms of "top", "bottom", "front", "rear", "left", "right" and "lateral side" used in describing components as disclosed in the patent specification are beneficial to understanding of corresponding relationship inside a tabular structure but not regarded as limiting the scope of the preset invention in which the orientation of a realistic product structure is changed with an angle of view for the product or a mutual relationship between the product and a user's location.

The terms of "form/forming" and "extend/extending" used in describing correlations of components inside a structural composition as disclosed in the patent specification mean one structural body integrally linking another structural body.

Figure 1:
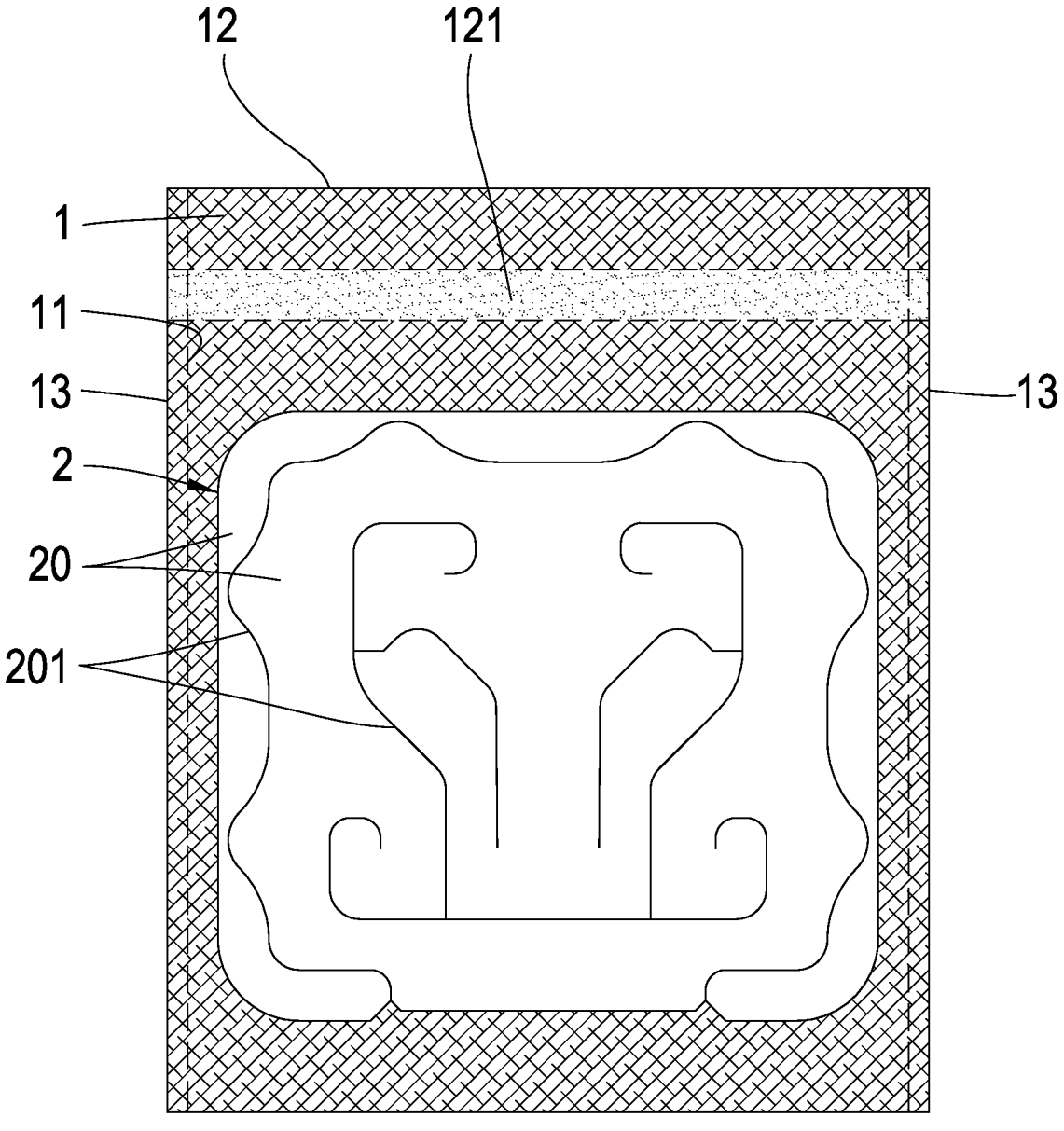
FIG. 1 is a schematic plane view for an overall appearance of a drip coffee filter structure.
Figure 2:
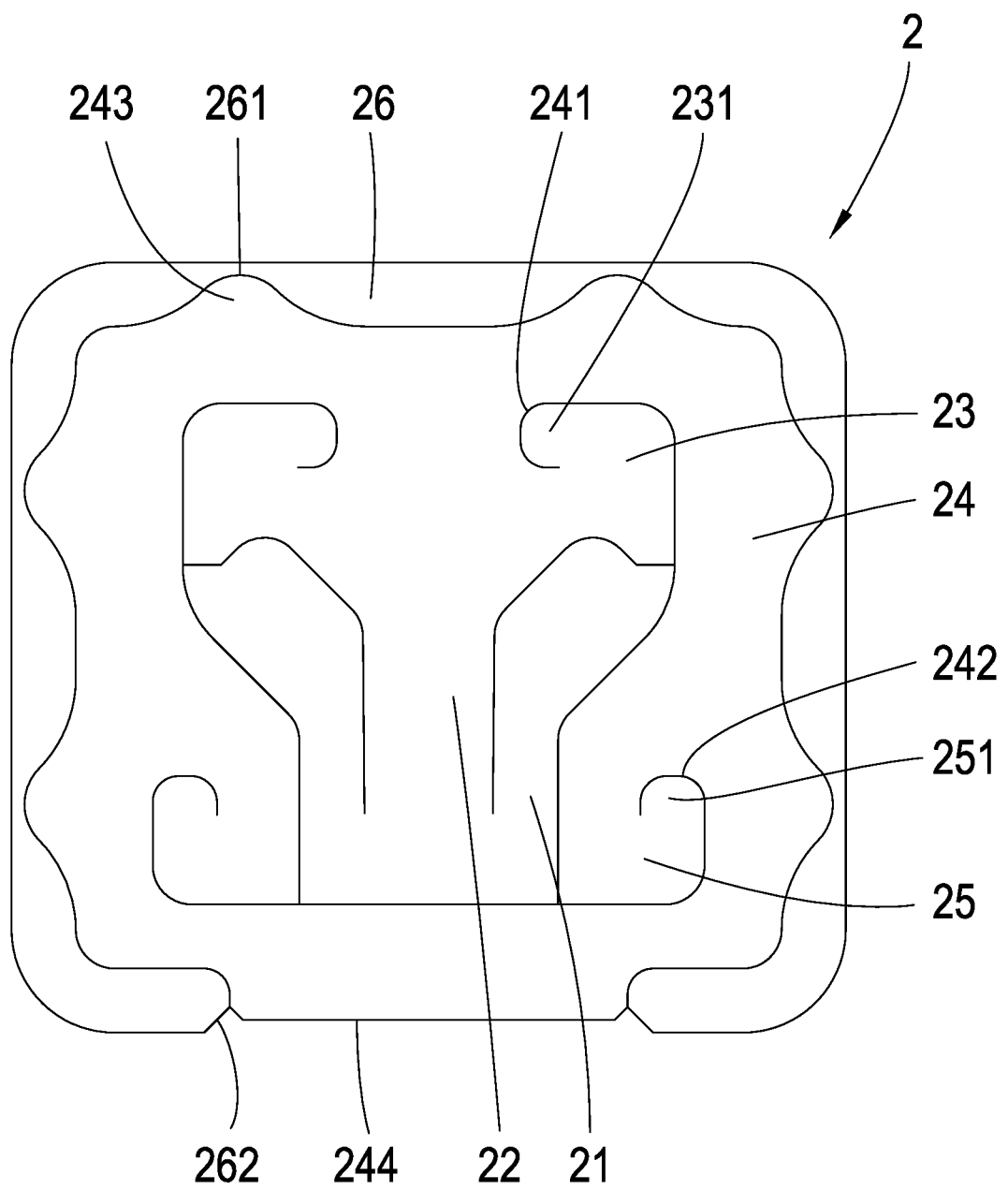
FIG. 2 is a schematic plane view for the structure of a hanging ear device in a drip coffee filter structure.
Figure 3A:
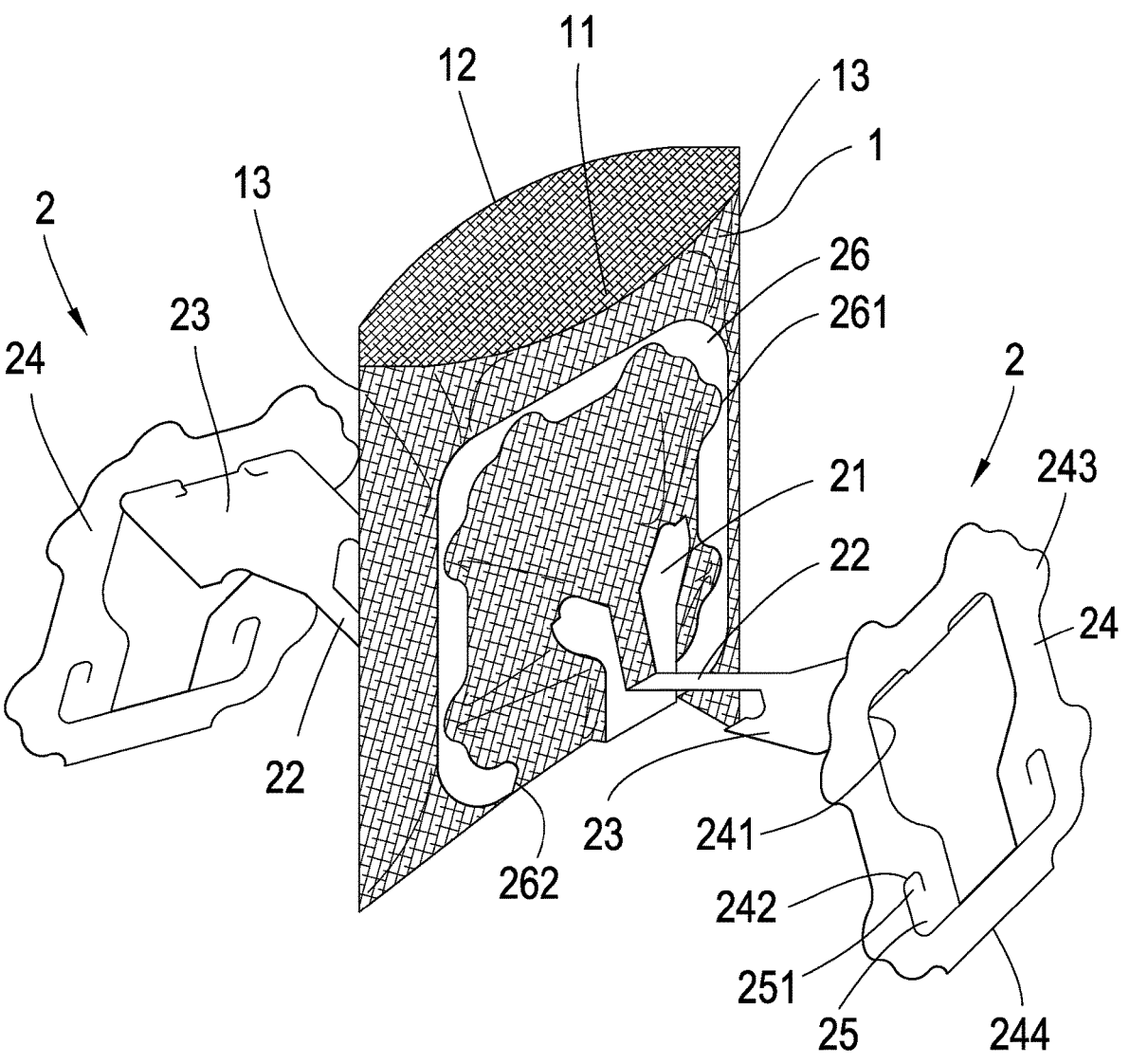
FIG. 3A is a schematic perspective view of a drip coffee filter structure which is hung upright.

Referring to FIG. 1, FIG. 2 and FIG. 3A, which are a schematic plane view, another schematic plane view and a schematic perspective view of a drip coffee filter structure, respectively. As shown in figures, a drip coffee filter structure comprises at least a filter bag 1 and hanging ear devices 2 designed at both sides of the filter bag 1, respectively.

In a drip coffee filter structure, the filter bag 1 has a cavity 11 internally and comprises a water inlet 12 opened on one side, a sealing edge 121 on the water inlet 12 to be torn open, and one tear-off edge 13 at one side of the water inlet 12 or two tear-off edges 13 at both sides adjacent to the water inlet 12 wherein each tear-off edge 13 is sealed by means of a high-frequency sealing process preferably, closed normally and torn open optionally for a larger opening developed by the torn tear-off edge 13 and the water inlet 12, both of which interconnect with each other.

In a drip coffee filter structure, each of the hanging ear devices 2 comprises multiple cut-off lines 201 cut on a sheet material 20 for development of several tensile, foldable and stretchable sections subject to the cut-off lines 201 on the sheet material 20. The sections are: a fixed portion 21 inside the hanging ear device 2; a connective segment 22 extending from the top of the fixed portion 21; two first engagement portions 23 extending to both sides from the connective segment 22, respectively; a first hook portion 231 extending from each of the first engagement portions 23 and toward the center of the fixed portion 21 horizontally and having a hooked contour further extending downward and outward and becoming a continuous inverted-hook shape; an inner annulus segment 24 extending from the top of the connective segment 22 and surrounding the fixed portion 21 and the connective segment 22 circumferentially; a second engagement portion 25 extending inward from each of the inner annulus segments 24; a second hook portion 251 extending from each of the second engagement portions 25 and having a hooked contour vertically extending toward the water inlet 12 and becoming a continuous inverted-hook shape which extends horizontally and keeps away from the water inlet 12. The specific positions for the design of a drip coffee filter structure are presented as follows: the two first engagement portions 23 are adjacent to the water inlet 12 but the two second engagement portions 25 are away from the water inlet 12 such that the two first engagement portions 23 on top and the two opposite second engagement portions 25 on bottom sit atop four corners inside the inner annulus segment 24; the first hook portions 231 make multiple first slots 241 develop at inner sides of the inner annulus segment 24; the second hook portions 251 make multiple second slots 242 develop at inner sides of the inner annulus segment 24; the inner annulus segment 24 forms an outer annulus segment 26 circumferentially and comprises multiple convex portions 243 extending outward for development of concave portions 261 at the inner side of the outer annulus segment 26 correspondingly; the inner annulus segment 24 comprises a pull-out portion 244 at one edge extending outward for development of a detachment portion 262 at the outer annulus segment 26; the outer annulus segment 26 and the fixed portion 21 are fixed at both lateral sides of the filter bag 1, respectively.

Referring to FIG. 3A for a drip coffee filter structure in the present disclosure: the sealing edge 121 is torn open and the pull-out portions 244 on the two hanging ear devices 2 are pulled outward such that the inner annulus segment 24 is separated from the outer annulus segment 26 and the connective segment 22 is affected by the inner annulus segment 24 correspondingly; the fixed portion 21 along with two lateral sides of the filter bag 1 are hauled out by the connective segment 22 for stretching the cavity 11; a drip coffee filter is hung with a crevice between the inner annulus segment 24 and the connective segment 22 positioned at a cup rim 31 of a cup 3 for a distinct hanging mode as required.

Figure 3B:
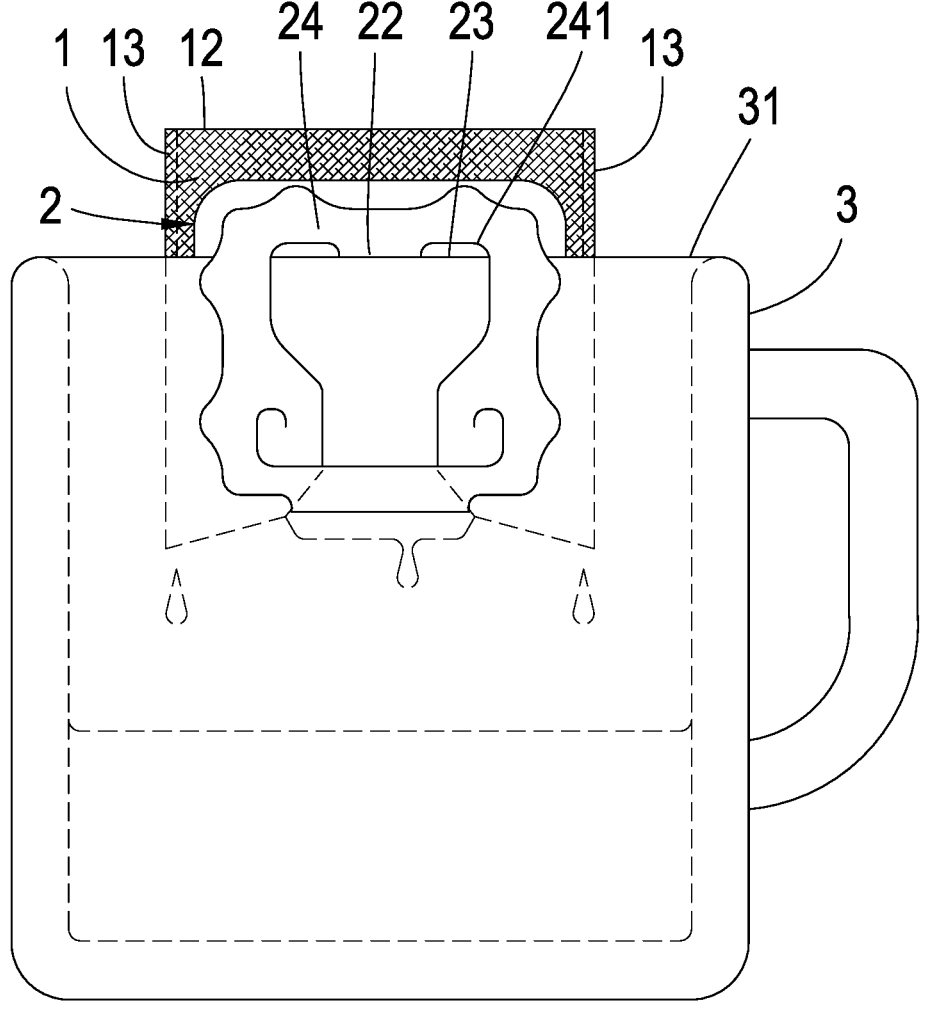
FIG. 3B is a schematic plane view of a drip coffee filter structure which is hung upright.

(1) Referring to FIGS. 3A and 3B, which illustrate the hanging ear device 2 is hung upright and the cup rim 31 is contacted between the inner annulus segment 24 and the connective segment 22 and adjacent to the first engagement portion 23. The water inlet 12 of the filter bag 1 opposite to the top of the fixed portion 21 faces upward such that raw materials (coffee powders) are poured into the cavity 11 from the water inlet 12 and extracted and coffee grounds are filtered from the bottom edge of the filter bag 1.

Figure 4A:
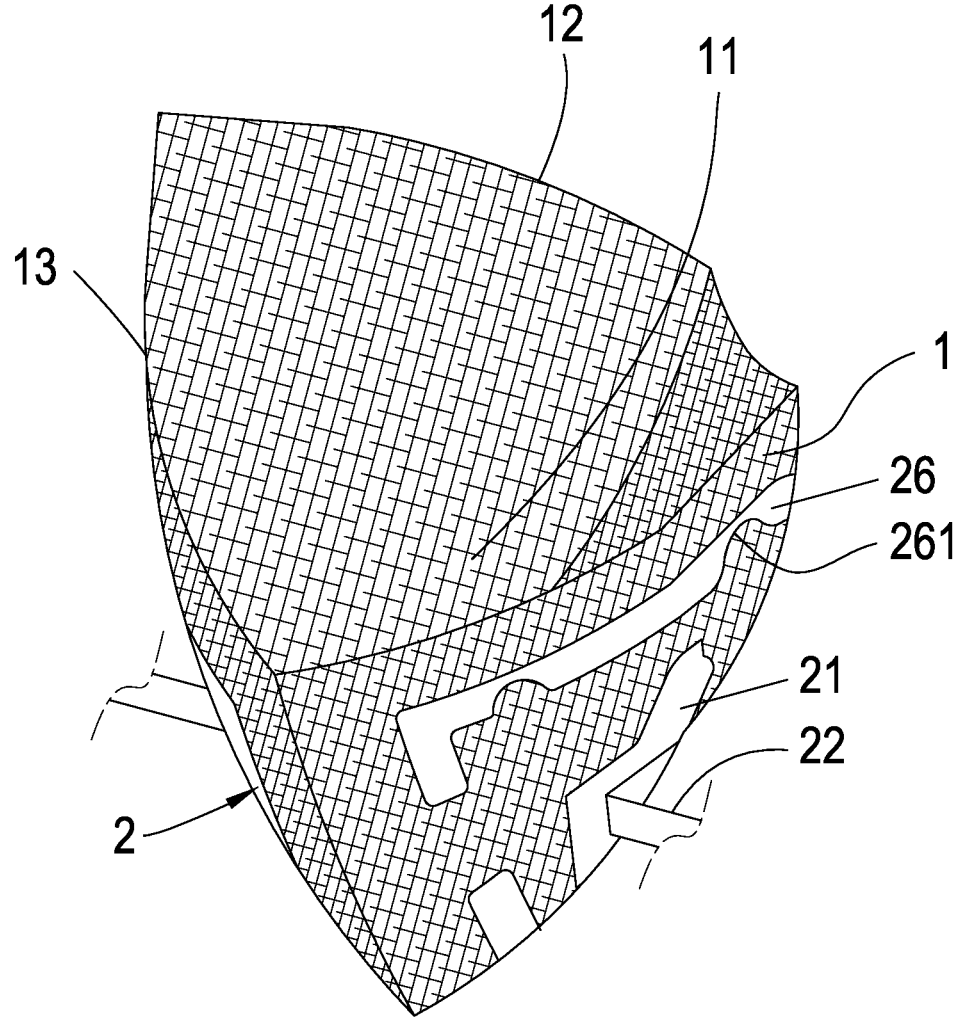
FIG. 4A is a schematic perspective view of a drip coffee filter structure which is hung lopsidedly.
Figure 4B:
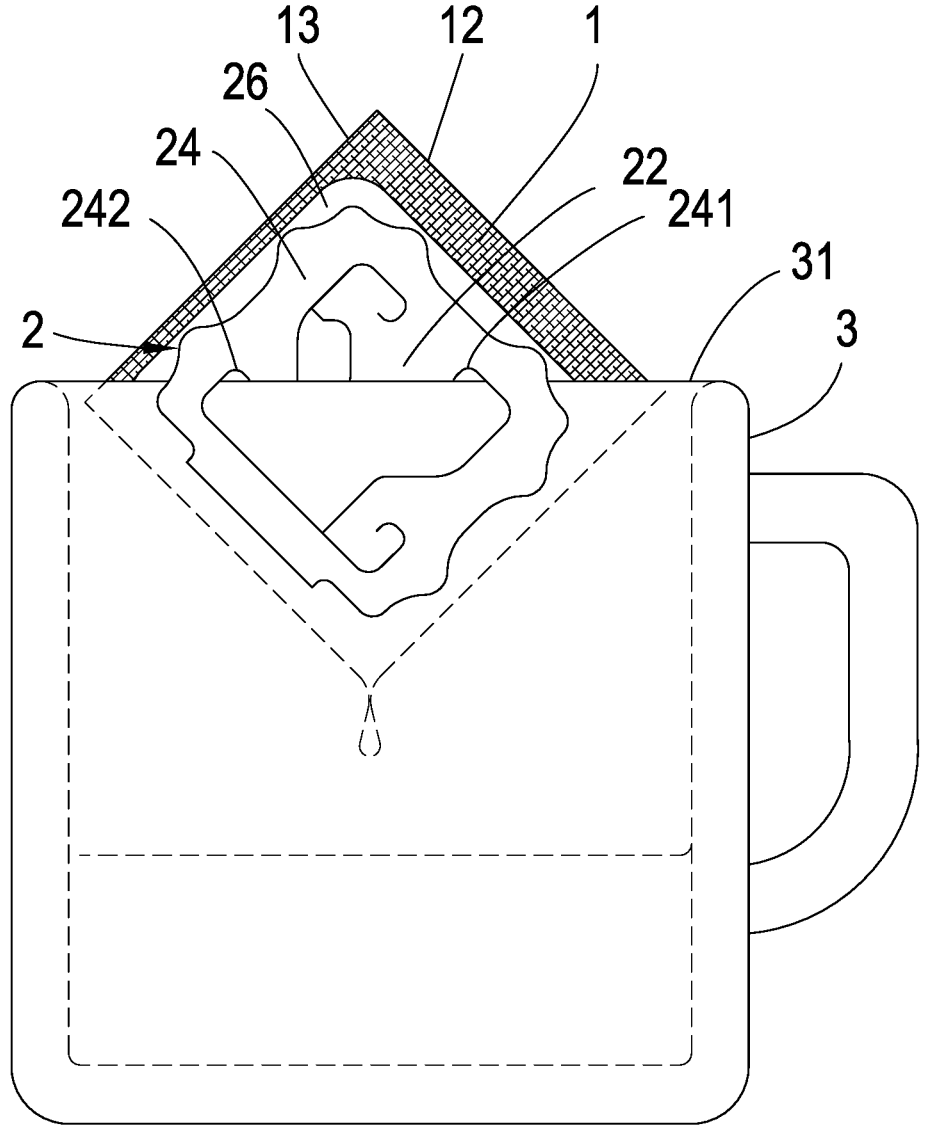
FIG. 4B is a schematic plane view of a drip coffee filter structure which is hung lopsidedly.

(2) Referring to FIGS. 2, 4A and 4B, which illustrate the hanging ear device 2 is hung lopsidedly and the cup rim 31 is coupled with one of the first slots 241 as well as the second slot 242 diagonally opposite to the first slot 241 after one of the tear-off edges 13 is torn open. Moreover, the water inlet 12 and the torn tear-off edge 13, both of which face upward and lopsidedly, interconnect with each other for a larger opening. Accordingly, raw materials (coffee powders) are poured into the cavity 11 from the larger opening and extracted due to interconnection of the water inlet 12 and the tear-off edge 13; coffee grounds are filtered from the tip at which two bottom edges of the filter bag 1 intersect when the hanging ear device 2 is hung lopsidedly.

Referring to FIGS. 3A, 3B, 4A and 4B, which illustrate different paths for filtration of coffee and intriguing flavor correspondingly. For that matter, coffee is filtered by the filter bag 1 through a distinct path when the hanging ear device 2 is hung upright or lopsidedly according to a coffee drinker's preference. Moreover, the cup rim 31 is firmly coupled with one first hook portion 231 and one second hook portion 251, each of which is designed for an inverted-hook first slot 241 and an inverted-hook second slot 242.

Figure 5:
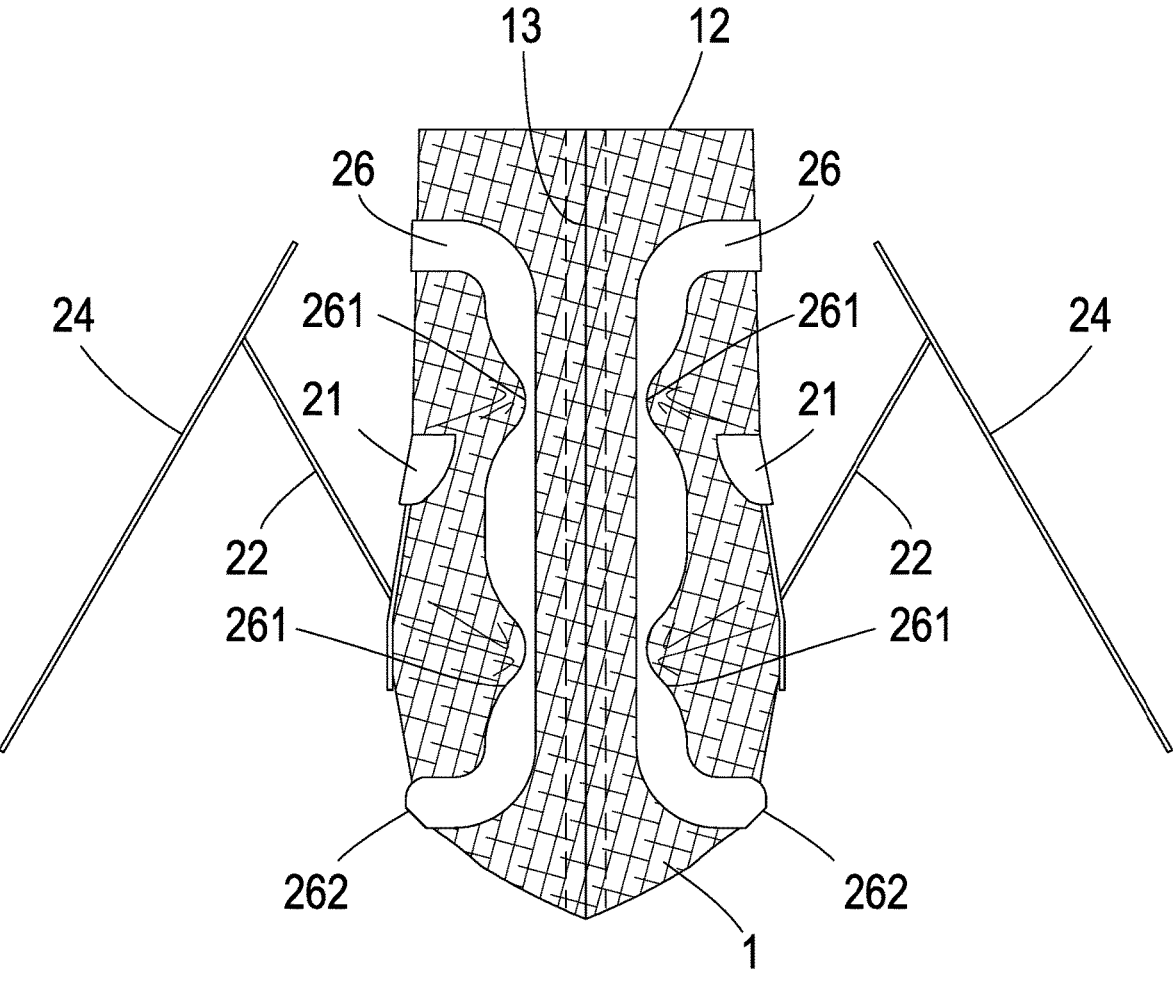
FIG. 5 is a schematic plane view of a drip coffee filter structure for filtration of coffee.

Referring to FIGS. 2, 3A and 5, which illustrate a couple of concave portions 261 at the inner side of the outer annulus segment 26 due to the convex portions 243. Accordingly, the cavity 11 which is being stretched is further amplified due to more changeable spaces at two lateral sides of the filter bag 1 provided by the concave portions 261.

A drip coffee filter structure has been disclosed in preferred embodiments which are not taken as examples to restrict the scope of the present application. Any change and/or modification made by the skilled persons who have general knowledge in the art and familiarize themselves with the above technical features and embodiments without departing from the spirit and scope of the present disclosure should be covered in claims of the patent specification.

What is claimed is:

1. A drip coffee filter structure, comprising:

a filter bag which has a cavity internally and comprises a water inlet opened thereon and tear-off edges at both sides adjacent to the water inlet wherein each tear-off edge is closed normally and torn open optionally;

two hanging ear devices on both sides of the filter bag, respectively, wherein: each of the hanging ear devices comprises (a) a fixed portion inside the hanging ear device, (b) a connective segment extending from the top of the fixed portion, (c) two first engagement portions extending to both sides from the connective segment, respectively, (d) a first hook portion extending from each of the first engagement portions, (e) an inner annulus segment extending from the top of the connective segment and surrounding the fixed portion and the connective segment circumferentially, (f) a second engagement portion extending inward from each of the inner annulus segments and (g) a second hook portion extending from each of the second engagement portions; the first hook portions make multiple first slots develop at inner sides of the inner annulus segment; the second hook portions make multiple second slots develop at inner sides of the inner annulus segment; the inner annulus segment links an outer annulus segment circumferentially; the outer annulus segment and the fixed portion are fixed at both lateral sides of the filter bag, respectively;

wherein the two first engagement portions are adjacent to the water inlet but the two second engagement portions are way from the water inlet such that the two first engagement portions on top and the two opposite second engagement portions on bottom sit atop four corners inside the inner annulus segment;

wherein the first hook portion extends from each of the first engagement portions and toward the center of the fixed portion horizontally and has a hooked contour further extending downward and outward and becoming a continuous inverted-hook shape;

wherein each of the second hook portions has a hooked contour vertically extending toward the water inlet and becoming a continuous inverted-hook shape which extends horizontally and keeps away from the water inlet.

2. The drip coffee filter structure as claimed in claim 1 wherein the hanging ear device comprises multiple cut-off lines cut on a sheet material for development of several tensile, foldable and stretchable sections subject to the cut-off lines, that is, the connective segment, the first engagement portions, the inner annulus segment and the second engagement portions on the sheet material.

3. The drip coffee filter structure as claimed in claim 1 wherein the outer annulus segment forms multiple concave portions at the inner side.

4. The drip coffee filter structure as claimed in claim 1 wherein the inner annulus segment comprises multiple convex portions extending outward for development of concave portions at the inner side of the outer annulus segment correspondingly.

5. The drip coffee filter structure as claimed in claim 1 wherein the inner annulus segment comprises a pull-out portion extending outward from one edge.

6. The drip coffee filter structure as claimed in claim 5 wherein the pull-out portion makes the outer annulus segment form a detachment portion.

7. The drip coffee filter structure as claimed in claim 1 wherein the water inlet is provided with a sealing edge to be torn open.

* * * * *